Dec. 1, 1936.  H. A. CENTERVALL  2,062,296
ECCENTRIC VALVE CONTROL
Filed April 21, 1933
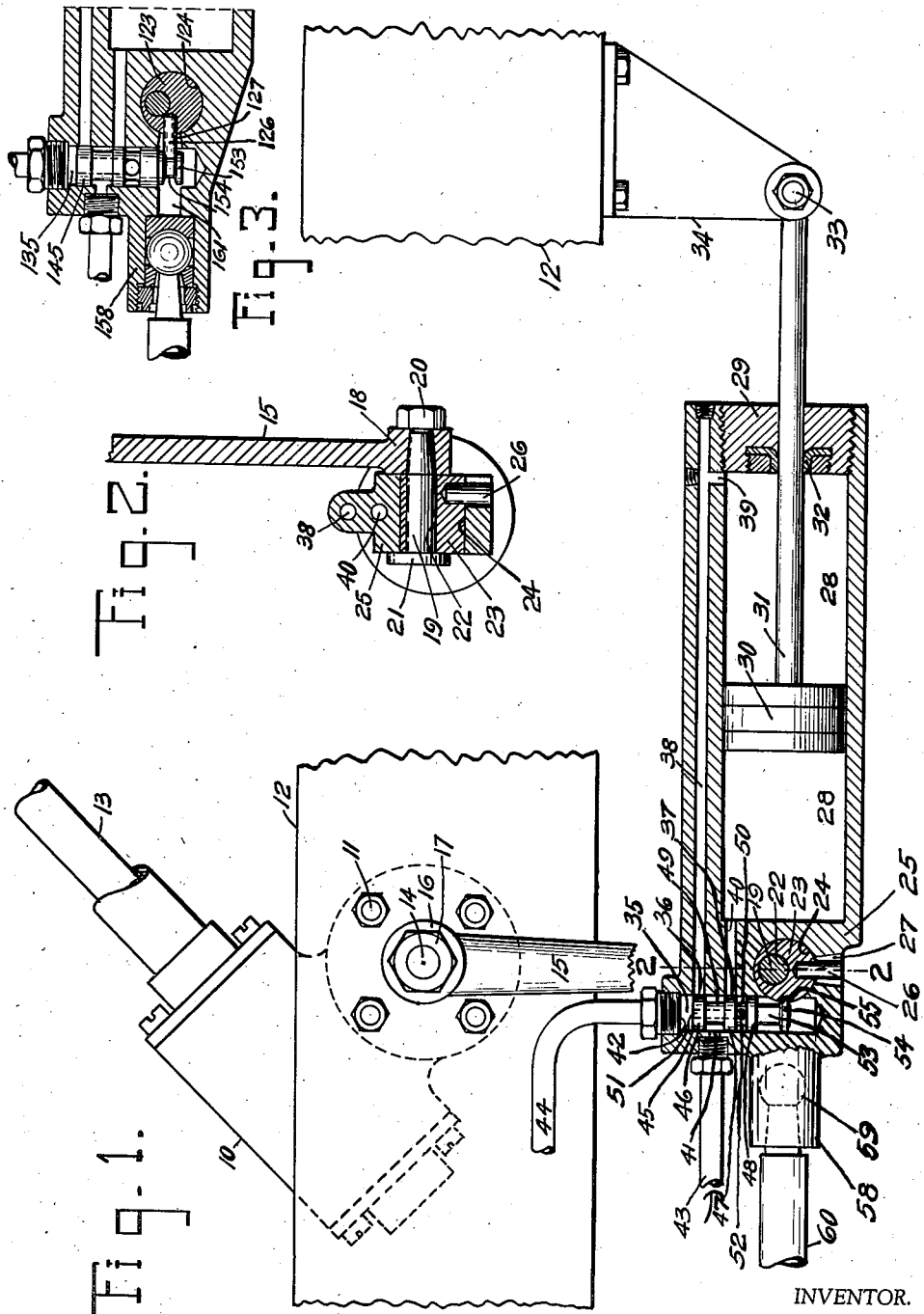
INVENTOR.
Hugo A. Centervall
BY
Pennie, Davis, Marvin & Edwards
HIS ATTORNEYS Patented Dec. 1, 1936

2,062,296

UNITED STATES PATENT OFFICE 2,062,296

ECCENTRIC VALVE CONTROL

Hugo A. Centervall, Brooklyn, N. Y., assignor to Manly Corporation, New York, N. Y., a corporation of New York Application April 21, 1933, Serial No. 667,148

7 Claims. (Cl. 121—41)

This invention relates to control mechanism for power devices operated by fluid under pressure and more particularly to control mechanisms for devices of this class which are adapted to perform such functions as braking and steering of a motor vehicle. I have accordingly chosen to illustrate the invention in connection with hydraulic power steering apparatus for a conventional automobile.

The principal object of the invention is to provide an improved mechanism of this class that is simple, compact and positive in action. Other and more specific objects will appear from the following description of an illustrative embodiment of the present invention shown in the accompanying drawing.

In the drawing:—

Figure 1 is a side view, partly in section, showing a preferred embodiment of the invention as applied to steering apparatus for a conventional automobile.

Figure 2 is a view, partly in section, taken along the line 2—2 of Figure 1.

Figure 3 is a fragmentary side view, partly in section, showing a modification.

Before explaining the present invention, it is to be understood that the invention is not limited in its application to the details of construction and arrangement of parts described herein and illustrated in the accompanying drawing, since the invention is capable of other embodiments and of being practised and carried out in other ways. It is also to be understood that the phraseology or terminology used herein is for the purpose of description and not for limitation, and it is not intended to limit the invention beyond the terms of the several claims hereto appended as considered in view of the prior art and the requirements thereof.

Referring now to Figure 1 of the drawing, the steering gear casing 10 is appropriately supported, as by bolts 11, upon the side member 12 of the frame of the motor vehicle. The steering shaft 13 is operatively connected with the steering arm 15 by means of mechanism, not shown, in the steering gear casing 10 and the steering arm cross shaft 14 which projects through a suitable opening in the side frame member 12 and to which the hub 16 on the upper end of said steering arm 15 is appropriately secured, as by the nut 17. The steering shaft 13 is adapted to be rotated by the usual steering wheel, not shown, and the arrangement is such that counter-clockwise rotation of said steering shaft 13 causes the steering arm 15 to swing forwardly, or toward the left as viewed in Figure 1, and similarly clockwise rotation of said steering shaft 13 causes said steering arm 15 to swing rearwardly in the usual manner.

As shown in Fig. 2, the lower end of the steering arm 15 is formed with a hub 18 whose preferably tapered bore is adapted to receive one end of a steering arm pin 19 which is held in place by an appropriate nut 20 on the threaded end of said pin 19 projecting through said bore. The steering arm pin 19 is received within a bore 22 positioned eccentrically in a cylindrical member 23, hereinafter termed the "eccentric", which in turn is received within the bore 24 formed in the cylinder body, broadly designated by the numeral 25. The parts are held in position by the flange 21 formed on the end of the steering arm pin 19 and the arrangement is such that the eccentric 23 is free to turn about said steering arm pin 19 and is likewise free to turn in the bore 24. The amount of turning or rotation of the eccentric 23 in the bore 24 is limited by the pin 26 whose one end is secured in said eccentric 23 and whose other end is here shown as projecting downwardly into a suitable slot 27 whose ends act as stops for said pin 26.

The cylinder body 25 is here shown as of the movable type and includes a cylinder 28 whose open end is closed by a suitable plug 29. Slidable within the cylinder 28 is a double acting piston 30 attached to one end of a piston rod 31 which projects rearwardly through an appropriate opening in the plug 29, suitable packing 32 being used to prevent leakage. The rear or outer end of the piston rod 31 is pivotally attached, as at 33, to a bracket 34 depending from and supported by the side frame member 12. The cylinder body 25 is thus supported by the steering arm pin 19 and the piston rod 31 and is therefore movable lengthwise of said side frame member 12 and is free to rock to adjust itself to any angularity with respect to the steering arm 15 and other parts of the apparatus. The piston 30 and the piston rod 31, however, are held against any longitudinal movement with respect to the side frame member 12 but are likewise free to rock upon the pivot 33 to adjust for any angularity of the cylinder body 25.

The cylinder body 25 is also shown as including a cylindrical valve bore 35 which in this instance is positioned at substantially right angles to the bore of the cylinder 28. The valve bore 35 is provided with a port 36 formed by its intersection with the passage 38 which, together with the passage 39, connects said valve bore with the rear end of the cylinder 28; similarly, the valve bore 35 is provided with a port 37 formed by its intersection with the passage 40 which connects said valve bore 35 with the forward end of the cylinder 28. The valve bore 35 is also provided with a high pressure inlet port 41 positioned intermediate of the ports 36 and 37 and with an exhaust port 42 located in the upper end of said valve bore 35. The high pressure inlet port 41 is suitably connected with one end of a flexible tubing 43 which connects said port 41 with the source of pressure fluid, not shown, and similarly the exhaust port 42 is suitably connected to one end of a flexible tubing 44 which connects said port 42 with a reservoir, not shown.

Within the valve bore 35 is a slidably fitted control valve member 45 having three heads, 46, 47 and 48 respectively, which are separated by the reduced portions 49 and 50 respectively. In the present embodiment the proportions are such that when the control valve 45 is in its neutral position, as shown in Figure 1, the heads 46 and 47 cover the ports 36 and 37 respectively while the high pressure inlet port 41 is in communication with the reduced portion 49 in all positions of adjustment of said control valve 45. The control valve 45 is also provided with a longitudinal passage 51, indicated by the dotted lines, which extends through said control valve 45 from its upper end to the reduced portion 50 where it connects with the radial passage 52.

The control valve 45 is adapted to be moved lengthwise within the valve bore 35 and is accordingly operatively connected with the eccentric 23. In the present instance the control valve 45 is provided with a stem 53 upon whose end is formed a flange 54 which engages a suitable notch 55 in the periphery of the eccentric 23. Clockwise rotation of the eccentric 23, as viewed in Figure 1, therefore moves the control valve 45 upwardly while counter-clockwise rotation of said eccentric 23 moves said control valve 45 downwardly.

The connector 58 is here shown as formed integrally with the cylinder body 25 and is attached by the usual ball and socket construction, indicated by the dotted lines at 59, to one end of the usual drag link 60, here shown as broken off. The drag link 60 is presumed to be operatively connected with a conventional front road wheel assembly of an automobile in the usual manner, so that forward movement of said drag link 60 away from its neutral or straight ahead position, as shown in Figure 1, moves said front road wheels so as to cause the vehicle to turn toward the left; while rearward movement of said drag link 60 away from its neutral position moves said front road wheels so as to cause the vehicle to turn toward the right.

The operation of the device is as follows:

When the driver wishes to steer the vehicle toward the left, he turns the steering shaft 13, by means of the steering wheel, in a counter-clockwise direction which, through the intervening mechanism, causes the steering arm 15 to swing forwardly or to the left as viewed in Figure 1. To the steering arm pin 19 is thus imparted a force tending to move it forwardly with respect to the cylinder body 25, and this force, acting upon the eccentrically positioned bore 22, causes the eccentric 23 to turn in a counter-clockwise direction in its bore 24 and consequently moves the control valve 45 downwardly in the valve bore 35. This turning of the eccentric 23 causes a very slight raising of the adjacent end of the cylinder body 25 but this is such a small amount as to be practically negligible and is readily permitted by the ball and socket connection with the drag link 60 and the pivotal mounting 33 of the piston rod 31. As the control valve 45 begins to move, however, the head 47 begins to uncover the port 37 and thus admits high pressure fluid from the tubing 43, the high pressure inlet port 41 and the reduced portion 49 into the forward end of the cylinder 28; at the same time, the head 46 begins to uncover the port 46 and thus connects the rear end of the cylinder 28 with the upper end of the valve bore 35, the exhaust port 42 and the tubing 44 so that excess fluid may pass out of the rear end of said cylinder 28 and return to the reservoir.

As the piston 30 is held against longitudinal movement, the pressure thus exerted by the high pressure fluid in the forward end of the cylinder 28 moves said cylinder 28, and hence the entire cylinder body 25 and the drag link 60, forwardly or toward the left as viewed in Fig. 1. Power is thus transmitted through the drag link to the front road wheel assembly and causes said road wheels to move so as to turn the vehicle toward the left. This movement continues as long as the driver continues to turn the steering shaft 13 in a counter-clockwise direction.

As the cylinder body 25 moves forward, however, it obviously carries with it the eccentric 23 and as long as said eccentric 23 and the steering arm pin 19 move at the same speed and there is no relative movement between them, said eccentric 23 will not turn in its bore 24 and hence there will be no movement of the control valve 45. But whenever the speed of the eccentric 23 exceeds the speed of the steering arm pin 19, as when the driver turns the steering shaft 13 more slowly or ceases to turn it at all, the force exerted upon said eccentric 23 by the moving cylinder body 25 tends to swing said eccentric 23 forwardly about the steering arm pin 19 as a pivot and hence causes said eccentric 23 to turn in a clockwise direction in its bore 24. This clockwise rotation of the eccentric 23 moves the control valve 45 upwardly, thus tending to return it to its neutral position as shown in Figure 1. A follow-up action is thus set up so that when the driver stops turning the steering shaft 13, the control valve 45 almost immediately closes the ports 36 and 37, thus cutting off admission of the high pressure fluid from the forward end of the cylinder 28 and cutting off the exhaust of fluid from the rear end of said cylinder 28. The cylinder body 25 and its connected members are thus brought to rest.

To steer the vehicle toward the right, the driver turns the steering shaft 13 in a clockwise direction and the operation of the controls and of the cylinder 28 is obviously reversed. High pressure fluid is now admitted to the rear end of the cylinder 28 and excess fluid is exhausted from the forward end of said cylinder 28, passing through the port 37, the reduced portion 50, the radial passage 52, the longitudinal passage 51, the upper end of the valve bore 35 and out through the exhaust port 42 and the tubing 44 to the reservoir.

Steering is thus effected by power and it is necessary for the driver to expend only enough energy to move the control members, and this is practically negligible.

It will be evident from the foregoing that there is a corresponding definite fore and aft position of the cylinder body 25 for every position of the steering arm pin 19 and the device operates to continuously maintain this corresponding position. For purposes of illustration, let us assume that the parts are in the position shown in Figure 1, that the steering arm pin 19 is stationary and that the cylinder body 25 is displaced, as because of leakage from the cylinder 28 for example, toward the right. As this displacement of the cylinder body 25 commences, the eccentric 23 immediately begins to turn in a counter-clockwise direction in its bore 24 and with the steering arm pin 19 as a pivot, thus moving the control valve 45 downwardly. The forward end of the cylinder 28 is thus almost immediately connected with the high pressure inlet port 41 and the high pressure fluid almost instantaneously moves the cylinder body 25 toward the left and restores it to its proper position, the control valve 45 likewise being restored to its neutral position by the follow-up action already described. It is therefore impossible for the cylinder body 25 to be displaced any material distance away from its proper position and any displacement that may occur is almost instantaneously rectified.

If the source of high pressure fluid should fail or if the power apparatus should for any reason fail to respond, steering may be effected manually by the same movement of the same controls already described for power steering, though the driver must obviously exert more energy. In this case the operation of the steering arm pin 19, the eccentric 23 and the control valve 45 is initially the same as in power steering but when the power apparatus fails to respond and to produce the follow-up action, the movement of these parts continues until the pin 26 strikes one end or the other of the slot 27. Further rotation of the eccentric 23 is thus prevented and manual power may be transmitted to the drag link 60.

The embodiment shown in Figure 3 differs from that already described principally in that the pin 126 not only serves to limit the rotation of the eccentric 123 but is also employed to actuate the control valve 145. In this instance the pin 126 projects forwardly from the eccentric 123, in which its one end is suitably secured, through the slot 127 which connects the bore 124 with the valve bore 135. The valve stem 153 is formed with a groove 154 which engages the forward end of the pin 126 and the arrangement is preferably such that said pin 126 is substantially at right angles to the control valve 145 when said control valve 145 is in its neutral position as shown in Figure 3. This construction makes it possible to employ a smaller eccentric than might otherwise be required to produce the desired movement of the control valve 145.

For ease in assembly, there is also provided a hole 161 drilled substantially in line with the slot 127 and connecting the valve bore 135 with the usual hollow end of the connector 158. Likewise, the slot 127 is preferably elongated lengthwise of the bore 124. In assembling, the eccentric 123 is first inserted in the bore 124 and the pin 126 is inserted through the hole 161 and secured in the appropriate hole in said eccentric 123. The eccentric 123 is then moved lengthwise of the bore 124, as is made possible by the elongation of the slot 127, and the control valve 145 is inserted in the bore 135 through its open upper end. The eccentric 123 is then moved back into position in the bore 124 so that the groove 154 engages the pin 126.

While the control valves 45 and 145 have been herein shown and described as of the normally closed type which cuts off communication between the cylinder and the valve bore when the control valve is in its neutral position, the invention is not limited to the use of a control valve of this type. If preferred, for example, the control valve may be made of the normally open type by which both ends of the cylinder are in communication with the high pressure inlet port when said control valve is in its neutral position, or other types of control valve may be employed. Likewise, the pin 26 and the pin 126 may be made integral with the eccentric members, suitable modifications being made in other parts to permit assembly etc., or a key may be substituted for the pins and made to extend part or all of the length of the eccentric members in which appropriate key-ways are provided.

In both embodiments shown, it will be evident that the movement of the steering arm pin with respect to the cylinder body, or vice versa, produces a corresponding definite and positive movement of the control valve in one direction or the other and similarly that the response of the power apparatus produces a corresponding definite and positive movement of said control valve in the opposite direction. All movements of the control valve are thus positively actuated. It will also be evident that such movement of the valve actuating elements produces proportional but greater movement of the control valve and due to this multiplication of motion, the device may be made as sensitive as desired and the control valve structure may be varied through wider limits than would otherwise be practical.

I claim:

1. In a device of the class described, a fluid motor comprising a relatively stationary piston member and a relatively movable cylinder body having a bore therein, a valve controlling the operation of said motor, said valve being movable with and movable with respect to said cylinder body, a cylindrical member rotatably mounted in said bore, a manually movable control member connected eccentrically with said cylindrical member, and an operative connection between said valve and said cylindrical member for movement of said valve simultaneously with the rotation of said cylindrical member.

2. In a device of the class described, a fluid motor comprising a relatively stationary piston member and a relatively movable cylinder body having a bore therein, a valve controlling the operation of said motor, said valve being movable with and movable with respect to said movable cylinder body, a cylindrical member rotatably mounted in said bore, stops limiting the rotation of said cylindrical member in said bore, a manually movable control member connected eccentrically with said cylindrical member and an operative connection between said valve and said cylindrical member for movement of said valve simultaneously with the rotation of said cylindrical member.

3. In a device of the class described, a fluid motor comprising a relatively stationary member and a relatively movable member, a part so connected as to be movable with said movable member and having a bore therein, a valve controlling the operation of said motor, said valve being movable with and movable with respect to said part, a cylindrical member rotatably mounted in said bore, a manually movable control member connected eccentrically with said cylindrical member, and an operative connection between said valve and said cylindrical member for movement of said valve simultaneously with the rotation of said cylindrical member.

4. In a device of the class described a fluid motor comprising a relatively stationary and a relatively movable member, a part so connected as to be movable with said movable member and having a bore therein, a valve controlling the operation of said motor, said valve being movable with and movable with respect to said part, a cylindrical member rotatably mounted in said bore, stops limiting the rotation of said cylindrical member in said bore, a manually movable control member connected eccentrically with said cylindrical member, and an operative connection between said valve and said cylindrical member for movement of said valve simultaneously with the rotation of said cylindrical member.

5. In a device of the class described, a fluid motor comprising a relatively stationary member and a relatively movable member, a part so connected as to be movable with the movable member of said motor and having a bore therein, a longitudinally slidable valve carried by said part for controlling the operation of said motor, a cylindrical member rotatably mounted in said bore, a manually movable control member connected eccentrically with said cylindrical member, and an operative connection between said longitudinally slidable valve and said cylindrical member for movement of said valve simultaneously with the rotation of said cylindrical member.

6. In a device of the class described, a power-operated mechanism comprising a relatively stationary member and a relatively movable member, a part so connected as to be movable with said movable member and having an aperture therein, control means for said power operated mechanism, said control means being movable with and movable with respect to said part, an element mounted for rotative movement in said aperture, a manually movable control member connected within said aperture to said element to cause said element to rotate in said aperture and to transmit manual effort to said element, and an operative connection between said control means and said element for movement of said control means simultaneously with the rotation of said element.

7. In a device of the class described, a power-operated mechanism comprising a relatively stationary member and a relatively movable member, a part so connected as to be movable with said movable member and having a bore therein, control means for said power operated mechanism, said control means being movable with and movable with respect to said part, a cylindrical member rotatably mounted in said bore, a manually movable control member eccentrically connected with said cylindrical member, and an operative connection between said control means and said cylindrical member for movement of said control means simultaneously with the rotation of said cylindrical member.

HUGO A. CENTERVALL.